(No Model.)
B. H. WESSLAU.
COUPLING FOR UNDERGROUND CABLES.
No. 416,144. Patented Nov. 26, 1889.
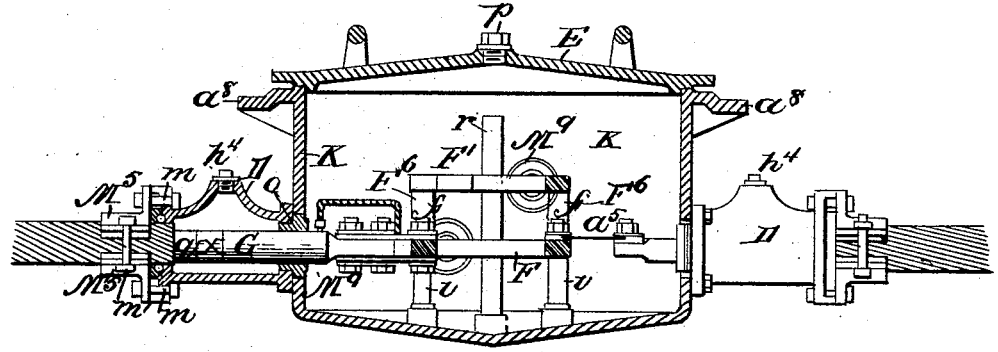
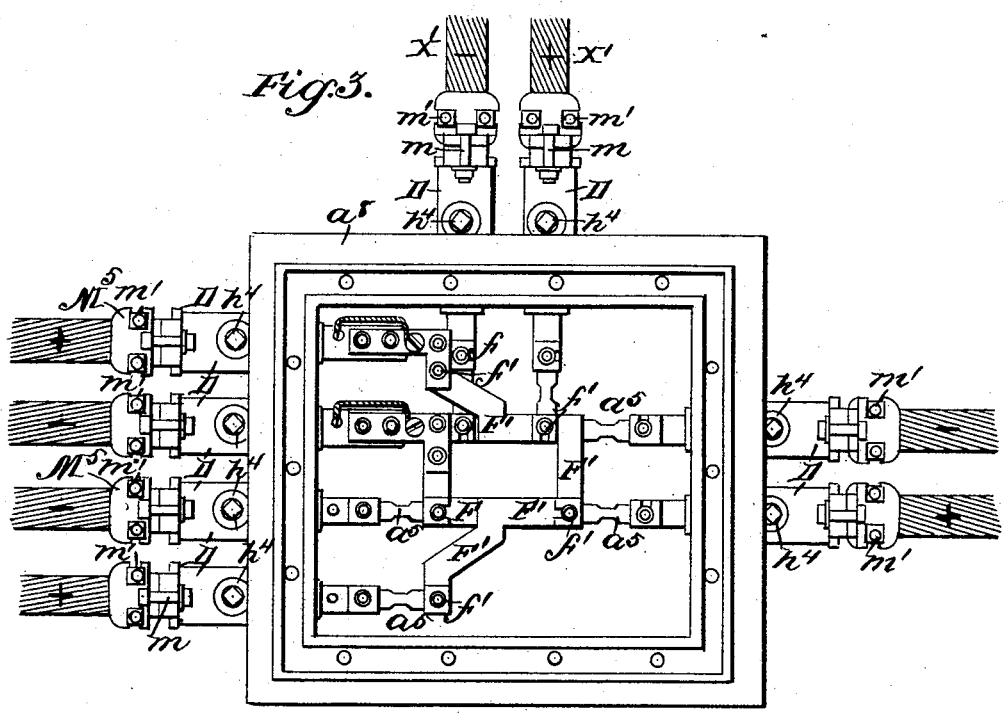
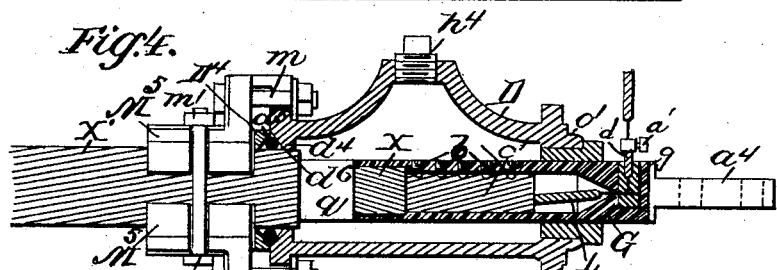
Witnesses  Inventor

UNITED STATES PATENT OFFICE.

BROR HEMMING WESSLAU, OF CHARLOTTENBURG, PRUSSIA, GERMANY.

COUPLING FOR UNDERGROUND CABLES.

SPECIFICATION forming part of Letters Patent No. 416,144, dated November 26, 1889.

Original application filed February 4, 1887, Serial No. 226,575. Divided and this application filed December 29, 1888. Serial No. 294,938. (No model.) Patented in Germany April 27, 1887, No. 42,256; in England September 2, 1887, No. 11,932; in France December 20, 1887, No. 187,711, and in Austria-Hungary February 18, 1888, No. 44,641 and No. 5,213.

*To all whom it may concern:*

Be it known that I, BROR HEMMING WESSLAU, a subject of the King of Prussia, German Emperor, residing at Charlottenburg, in the Kingdom of Prussia, German Empire, have invented certain new and useful Improvements in Devices for Coupling Underground Cables, (which have been patented in the German Empire by Letters Patent No. 42,256, of April 27, 1887; in England, No. 11,932, of September 2, 1887; in France, No. 187,711, of December 20, 1887, and in Austria-Hungary, No. 44,641/87, tome 38, folio 351, and No. 5,213/88, tome XXII, folio 325, of February 18, 1888;) and I do hereby declare that the following is a full, clear, and exact description of the invention, which will enable others skilled in the art to which it appertains to make and use the same.

My invention has for its object to provide a new and simplified construction of joints for coupling underground cables having only one conductor, and of cases or boxes for protecting the same from external injuries, this application being a division of one filed by me on the 4th day of February, 1887, Serial No. 226,575.

Cables which are used to convey electric energy generated at some point to places of consumption at greater or less distances must, partly with one another, partly with other conductors, be electrically connected. For this purpose connections are necessary which have to fulfill two requirements: In the first place, such connections must be safe mechanically and electrically, and, secondly, be well insulated and protected against injury. Different kinds of such connections are necessary, as will be hereinafter stated and described.

Referring to the accompanying drawings, in which corresponding parts are designated by similar letters, Figure 1 is a side view, partly in section, of an end-closure according to my invention. Fig. 2 is a vertical section of devices for connecting and protecting the joints of cables when a number of them meet at a single point, some of the cables having different-sized conductors. Fig. 3 is a top plan view of the same, and Fig. 4 is a detail view of the box D.

I use for the electrical connection of the conductor of a cable with other conductors at the engine-house, &c., an "end-closure," thus termed because the insulating layer of lead cable covering the conductor is to be closed air-tight against the permeation of moisture, which destroys the insulation of the cable.

With cables the conductors of which are formed of a number of metal wires twisted up into a rope the end-closure consists of a metal tube G, which upon its forward end is provided with female screw-threads $b$, which enter the rope $c'$, forming the conductor of the cable, thus forming an electrical connection. The metal tube terminates at its other end in a solid piece $a$, provided with a screw B for attaching a conductor. If with the conductor of the cable an insulated test-wire is twisted up, the solid end of the metal tube receives a boring for the reception of an insulating-block $g$. Into this block the test-wire is introduced, and held in place by means of the screw $d$, which also forms a conductive connection therewith. The head of this screw receives a central boring for a conducting-wire to be introduced and held fast by the small screw $a'$, which is introduced laterally in the screw $d$. Thus the conductive wire is electrically connected with the insulated test-wire L of the cable. When the above-described metal tube is shoved upon the free end of the conductor, an insulating-sheathing A is applied, so as to cover part of the metal tube G, part of the insulating-layer $x$ immediately surrounding the conductor $c'$, part of the lead $q$ covering the latter, and part of the insulating and protecting layer $x'$ put over the lead covering.

In case several cables, both positive and negative, meet at a single point, and all cables having like polarity are to be connected with each other, I use the devices consisting of an iron box K, provided with means for introducing the cables in a hermetical manner, and means for securing the necessary connections, as will now be described.

In order to introduce the cables into this case in an insulated and hermetical manner, each cable is provided with a metal tube G, similar to those heretofore described; or instead of having the screw B it has a metallic strip $a^4$ projecting from the end thereof. Over the cable end thus prepared an iron box D is shoved, which has a dome-shaped top provided with a screw-plug $h^4$, which may be removed in order to fill the box with any suitable insulating compound. The opposite ends of the box D are open to permit the passage of the cable and tube G, respectively. An annular beveled edge $d^4$ is formed around the opening through which the cable passes, while the annular washer $d^4$, surrounding the cable, has a corresponding beveled edge $d^5$. Between the beveled edges $d^4$ and $d^5$, and also surrounding the cable, is the ring of packing material $d^6$. Pieces $M^5$, having semi-cylindrical grooves therein, are adapted to be clamped upon the cable-cover by means of bolts $m'$, while the bolts $m$ permit the box D to be drawn toward the said clamp-pieces, thereby pressing the ring of packing against the cable-cover by means of the beveled faces $d^4$ $d^5$.

Suitable apertures $M^9$ are provided in the case K, and through these the ends of the tubes G projecting from the boxes D are passed. The tubes are insulated from the case K and boxes D by means of an ebonite cylinder $o$, surrounding the tube and filling up the opening in the end of the box and the aperture $M^9$ of the case, while the box D is also provided with a flange $o'$, which rests against the side of the case in order to form a more perfect joint.

Two sets of pole-pieces F F', one lying above the other, are provided within the casing K. The lower set F are supported from the bottom of the case by means of pillars $u$, of suitable insulating material, while the upper set F' are supported on the lower set F by means of three similar pillars $F^6$.

In order to protect cables having smaller conductors against an excess of current, I prefer to use strips $a^5$, of lead, &c., which upon the passage of a dangerously-strong current will melt. One of these strips $a^5$ is fastened upon the end of each of the strips $a^4$, and is connected to either of the corresponding pole-pieces F F', as the case may be, by means of screws $f f'$. The lower set F of pole-pieces are shown in the drawings as being connected to the strips $a^5$, and thus to the strips $a^4$ of the negative cables, while the upper set F' are connected in a similar manner to the plus cables, while the shape and size of the pole-pieces are suited to the number and position of the cables to be connected. After the cable ends have been introduced into the case in the manner described, and the desired connections have been established by the screws, the cover E is screwed on the case. The rim of the cover laps over the flanges $a^8$ on the sides of the case, so as to leave an intermediate space for the reception of packing. By screwing down the cover the packing is firmly pressed between the rim and flange, so as to effect an air-tight closure of the case. Any water which, notwithstanding this construction, may leak in accumulates at the lowest point of the bottom of the case and enters the suction-pipe $r$, from where, after loosening the screw $p$, located in the center of the cover, it can be removed by means of a syringe without requiring the removal of the cover.

Having now described my invention, what I claim, and desire to secure by Letters Patent, is—

1. In an electrical connector, the combination of a metallic tube having a solid end, and a binding-screw held thereby, an insulating-block inserted in the said tube, and a binding-screw inserted in the said block, whereby an electrical connection may be made by the main cable and a test-wire contained therein, as and for the purposes described.

2. In an electrical connector, the combination of a metallic tube terminating in a solid end piece, a binding-screw inserted in the said solid end for attaching the main conductor, an insulating-block $g$, also inserted in the said end, and a binding-screw $d$, inserted in the insulating-block, the head of the said screw $d$ having a central boring and a screw for connecting a test-wire, substantially as and for the purposes described.

3. In a coupling for underground cables, the combination of a box D, clamps $M^5$, and bolts $m'$, whereby the said clamps may be tightened upon the cable, and bolts $m$, whereby the said box may be drawn against the clamps, as and for the purposes described.

4. In a coupling for underground cables, the combination of a box D, having a beveled opening, clamps surrounding the cable, a ring of packing material surrounding the cable between the said clamps and the beveled opening of the box, and means for drawing the clamps and the box together, as and for the purposes described.

5. In a coupling for underground cables, the combination, with a metallic tube mounted upon the end of the conductor of the said cable, the said tube having a solid end piece, and means for forming an electrical connection therewith, of a protective box mounted on the said tube and cable, clamps surrounding and holding the cable, and means whereby the box may be drawn against the clamps, as and for the purposes described.

6. In a coupling for underground cables, the combination, with a female-threaded tube having a solid end piece, and means for making an electrical connection, of a protective box having openings at both ends mounted on the cable and tube, one of the said openings being beveled, clamps mounted on the cable, a washer having a beveled face, a ring of packing material, the said washer and packing material surrounding the cable between the clamps and the beveled opening of
5 the box, and means for drawing the box against the clamps, as and for the purposes described.

In testimony whereof I have hereunto set my signature in presence of two witnesses.

BROR HEMMING WESSLAU.

Witnesses:
　MAX WAGNER,
　B. ROI.